(12) United States Patent
Nusser et al.

(10) Patent No.: US 6,382,199 B2
(45) Date of Patent: May 7, 2002

(54) METHOD FOR DIAGNOSING AN EXHAUST-GAS RECIRCULATION SYSTEM OF AN INTERNAL COMBUSTION ENGINE

(75) Inventors: Claus-Dieter Nusser, Schwieberdingen; Axel Stuber, Tamm; Bernd Landes, Ditzingen; Martin Haussmann, Sachsenheim; Peter Henkelmann, Vaihingen; Joerg Kerner, Mundelsheim; Guido Ehlers, Wettstetten, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/759,458

(22) Filed: Jan. 16, 2001

Related U.S. Application Data

(63) Continuation of application No. 09/073,793, filed on May 7, 1998, now abandoned.

(30) Foreign Application Priority Data

May 7, 1997 (DE) .......................................... 197 19 278

(51) Int. Cl.$^7$ ........................... F02D 41/22; F02M 25/07
(52) U.S. Cl. ................... 123/690; 123/568.16; 701/108
(58) Field of Search ............................ 73/23.31, 23.32, 73/117.3, 118.1, 119 R; 123/568.16, 672, 698, 690; 701/107, 108

(56) References Cited

U.S. PATENT DOCUMENTS

| | | | |
|---|---|---|---|
| 4,640,257 A | * 2/1987 | Kodama et al. | 123/568.16 |
| 5,103,655 A | 4/1992 | Kano et al. | 73/118.1 |
| 5,137,004 A | 8/1992 | Takahata et al. | 123/571 |
| 5,150,695 A | 9/1992 | Kondo | 123/571 |
| 5,154,156 A | * 10/1992 | Ohuchi | 123/568.16 |
| 5,461,569 A | 10/1995 | Hara et al. | 73/118.1 |
| 5,474,051 A | 12/1995 | Matsumoto et al. | 73/118.1 |
| 5,916,130 A | 6/1999 | Nakae et al. | 73/118.1 |

* cited by examiner

*Primary Examiner*—Andrew M. Dolinar
*Assistant Examiner*—Arnold Castro
(74) *Attorney, Agent, or Firm*—Walter Ottesen

(57) ABSTRACT

A method for diagnosing an exhaust-gas recirculation system of an internal combustion engine provides that the fuel quantity, which is needed for a desired mixture composition, is computed, at least approximately, in a control apparatus from at least stored data of the EGR system. The stored data can be in the form of a through-flow characteristic line. Thereafter, the fuel quantity is corrected by a control factor in dependence upon the mixture composition. The control factor is computed and stored when the EGR system is switched on and the control factor is computed and stored when the EGR system is switched off. The difference of these control factors is then formed and compared to pregiven values. A fault signal is outputted in the event of a deviation.

6 Claims, 2 Drawing Sheets

METHOD FOR DIAGNOSING AN EXHAUST-GAS RECIRCULATION SYSTEM OF AN INTERNAL COMBUSTION ENGINE

This is a continuation of application Ser. No. 09/073,793, filed May 7, 1998 now abandoned.

FIELD OF THE INVENTION

The invention relates to a method for diagnosing an exhaust-gas recirculation system (EGR system) wherein the fuel quantity, which is needed for a desired mixture composition, is first approximately computed in a control unit from, inter alia, the stored data (especially of a through-put characteristic line) of the EGR system and, thereafter, is corrected via a control factor which is dependent upon the mixture composition. The mixture composition can be detected by a sensor.

BACKGROUND OF THE INVENTION

For some time, the exhaust-gas recirculation (EGR) is a known and often applied means for dropping especially the nitrogen oxide emissions of an internal combustion engine.

For this purpose, a defined component flow is taken from the exhaust gas of the engine and supplied to the fresh mixture.

The basis for this is that the exhaust gas of the engine is an inert gas with respect to its essential constituents, that is, a non-reacting gas. The combustion peak temperature is reduced by the admixture of an inert gas to the air/fuel mixture and in this way, the nitrogen oxide emission is reduced.

Electronically controlled EGR systems have been known for a long time which can adjust the optimal exhaust gas recirculation quantity in each operating point of the engine.

It is problematic with respect to all EGR systems that valves and lines become obstructed in the course of time because of deposits of solid substances from the exhaust gas. For this reason, the returned exhaust gas quantities become less with increasing operating time of the engine.

For this reason, it is necessary to monitor the function of an EGR system of this kind.

Furthermore, and because of regulations in the United States of America, all exhaust-gas relevant aggregates/functions of a vehicle having an internal combustion engine must be monitored by its own on-board diagnostic means.

U.S. Pat. No. 5,150,695 discloses a method for diagnosing an EGR system wherein a fault of the system is determined during overrun operation of the vehicle by a fault detecting device. The fault detecting device is for detecting faults of the control arrangement for the EGR system on the basis of a pressure value in the gas intake line when the control valve is in operation for the exhaust-gas recirculation. The fault detecting device also makes the determination of faults on the basis of a second pressure value in the exhaust-gas line when the control valve of the exhaust-gas recirculation is not in operation.

It is disadvantageous with respect to this method for diagnosing the EGR system that, in addition to a pressure sensor in the gas intake line, a further pressure sensor in the exhaust-gas line is required.

Furthermore, no quantitative statement can be obtained with respect to the magnitude of the fault.

SUMMARY OF THE INVENTION

It is an object of the invention to provide a method for diagnosing an exhaust-gas recirculation system of the kind described above wherein precise statements as to the operability of the EGR system can be made with the least possible technical complexity.

The method of the invention is for diagnosing an exhaust-gas recirculation system of an internal combustion engine including a control apparatus for controlling the engine. The method includes the steps of: computing approximately a fuel quantity needed for a desired mixture composition in the control apparatus from stored data of the exhaust-gas recirculation system; computing and storing a first control factor while the recirculation system is switched on; computing and storing a second control factor while the recirculation system is switched off; forming the difference between the first and second control factors; comparing the difference to pregiven values; and, if the difference constitutes a departure from the pregiven values, then outputting a fault signal.

The method of the invention has the significant advantage that no additional technical aggregates (such as pressure sensors or other sensors) are needed in order to diagnose the operability of the EGR system because the control factor for controlling the engine must, anyhow, be continuously determined. This advantage is facilitated by the following factors: the computation and storage of the control factor for a switched-in EGR system as well as for a switched-out EGR system; the formation of the difference of these control factors and the comparison of the difference to a pregiven limit value.

An especially advantageous embodiment of the method provides that the amount of the deviation is determined by the control unit and is used as input signal for the control of the engine. A compensation of the effects of deterioration such as because of the above-described deposits, is possible because of this quantitative evaluation of the deviation of the control factors for a switched-in and switched-out EGR system. In this way, especially an adaptive correction of the main load signal and the ignition of the internal combustion engine in an engine control apparatus is possible.

In this way, especially an extension of the service life of the EGR system is possible. Whereas for known EGR diagnostic methods, a fault is already signalized, a fault can at least be compensated to a certain extent over a certain time frame with the described adaptive correction.

In principle, and with an appropriate measuring accuracy as a precondition, the method can be utilized even for very small EGR rates. Preferably, the method is, however, only then carried out when the EGR rate is at least 5%.

Different embodiments are conceivable with respect to the sensors. However, the sensor is advantageously a lambda probe and the control factor is the lambda control factor which operates on the injection time.

In this way, especially precise quantitative statements as to the control factor are possible when the EGR is switched in and switched out.

BRIEF DESCRIPTION OF THE DRAWINGS

The invention will now be described with respect to the drawings wherein.

DESCRIPTION OF THE PREFERRED EMBODIMENTS OF THE INVENTION

Figure 2:
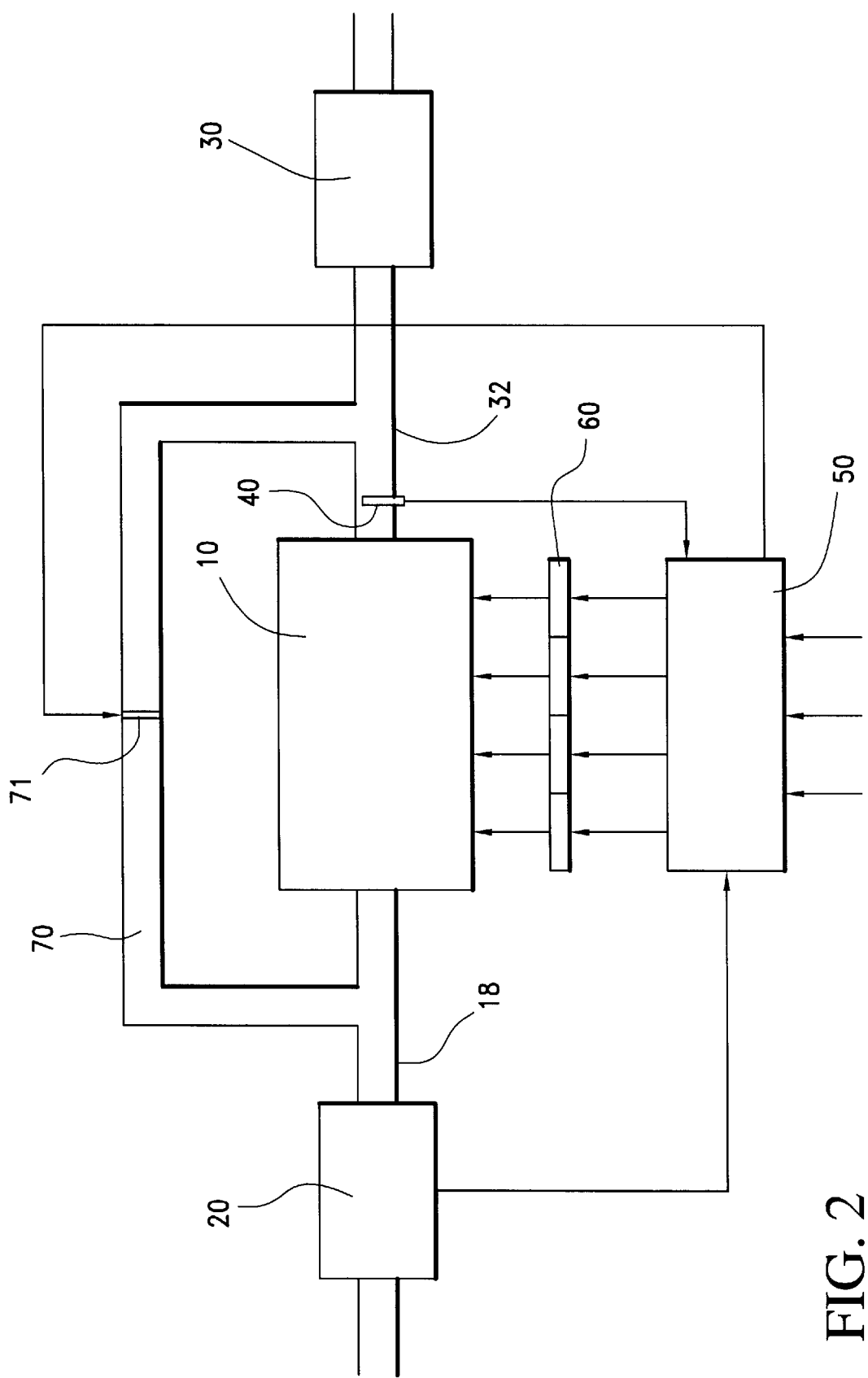
FIG. 2 shows schematically an internal combustion engine having a controlled catalytic converter and an exhaust-gas recirculation system.

An internal combustion engine 10 is shown schematically in FIG. 2. The engine 10 includes an intake line 18 in which an intake pressure sensor 20 is mounted for measuring the intake pipe pressure. The engine 10 also includes a catalytic converter 30 in its exhaust-gas line. The output signal of the intake pipe pressure sensor 20 is supplied to a control apparatus 50 which can control the variation of the injected quantity of fuel via valves 60. A lambda probe 40 is mounted forward of the catalytic converter 30 and has an output signal which is supplied to the control apparatus 50.

The intake line 18 is connected to the exhaust-gas line 32 via an exhaust-gas recirculation line 70. Recirculation line 70 can be opened and closed via an exhaust-gas recirculation valve 71 driven by the control apparatus 50.

One of the main tasks of an engine control is to adjust a desired optimal air/fuel ratio via an appropriate metering of an injected quantity VE. For this purpose, a load signal, which is proportional to the air mass inducted per stroke, is determined in a manner known per se. Then, the base injection time is formed from this load signal and the wanted desired value for the desired air/fuel ratio.

To obtain as precise a base injection time as possible, the actual exhaust gas recirculation quantity must be considered in the computation of the load signal. The exhaust-gas recirculation value is generally not measured directly but is determined via the EGR system from the input variables of the EGR system and stored data. When there are faults in the EGR system, the data, which are stored via the EGR system, no longer correspond to the actual data of the EGR system. The consequence of the foregoing is a deviation between the computed base injection time and the injection time, which is needed for the desired air/fuel ratio.

The method described in the following can be used especially for engine controls having intake pipe pressure sensors for detecting load (so-called P/N systems). In such systems, the input variables of the EGR system and the stored data via the EGR system must be considered when computing the base injection time. If this is not done, then no correlation of the injection time to the inducted air mass results. The deviation of the air/fuel ratio from the desired value, which results herefrom, can be detected by a lambda probe insofar as the lambda controller is not active. In practice, the lambda controller is, however, continuously active. Deviations between the stored and actual detected data of the EGR system influence the lambda control factor.

The basic idea of the present invention is therefore the evaluation of the lambda control factor. A deviation of this control factor to a pregiven value can, however, in principle, be caused by many faults and not only by faults in the EGR system.

For the above reason, a short-term switch-off of the EGR system is provided in the method of the invention so that the EGR system can be diagnosed. Faults, which cannot be attributed to the EGR system, continue to influence the control factor and change the control factor during switch-off only insignificantly. A change of the control factor as a consequence of a switch-off of the EGR system is therefore an indication as to a fault of the EGR system.

Figure 1:
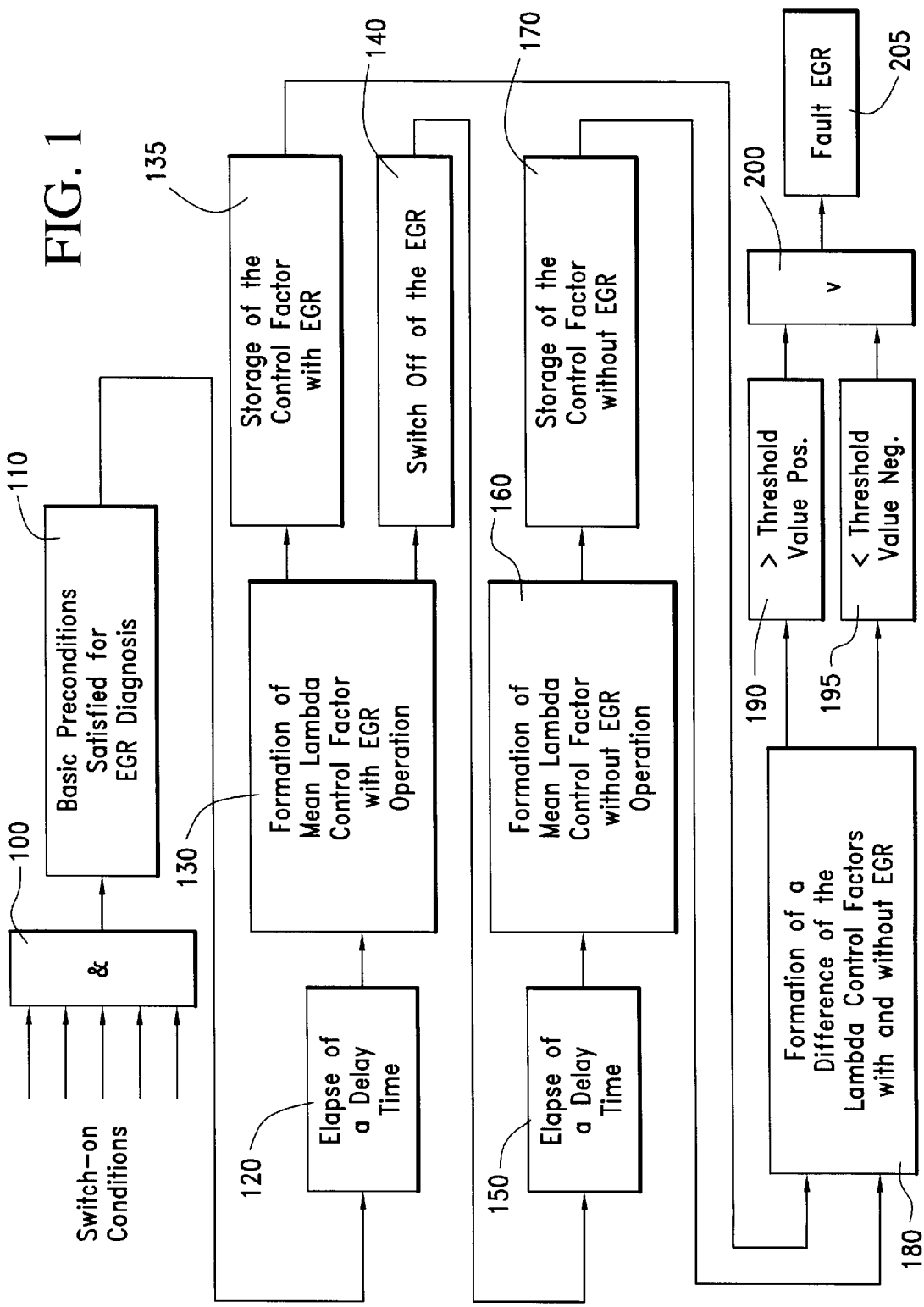
FIG. 1 shows the method sequence of the method of the invention.

A method is shown in FIG. 1 for diagnosing an exhaust-gas recirculation (EGR) system of an internal combustion engine 10. In this system, the mixture composition is detected by a sensor 40 and is supplied to the control apparatus 50. The control apparatus 50 outputs a control factor, which is dependent upon the mixture composition, for controlling the engine. As shown in FIG. 1, in a first step 100, a check is made as to whether pregiven simultaneous switch-in conditions are satisfied.

These switch-in conditions include:
(a) the engine 10 must be in a specific rpm/load window;
(b) the lambda control must be active;
(c) the exhaust-gas recirculation must be capable of activation (by driving EGR valve 71); and,
(d) the engine temperature must exceed a certain pregiven threshold.

If this is the case, then a start signal for an EGR diagnosis is outputted. First, the delay time must elapse (step 120) before the mean value formation of the control factor is undertaken in step 130. In this embodiment, the mean value formation of the control factor is the lambda control deviations for EGR operation.

With this delay time, it is ensured that the intake pipe of the engine 10 is filled completely with inert gas so that a stable condition is present.

The mean value, which is formed in step 130, is stored in step 135 as control factor when the EGR is switched in; in the present case, as a lambda control factor when the EGR is switched in.

In parallel to the above, the EGR is switched off in step 140.

Again, after a delay time has elapsed (step 150), the formation of the mean lambda control value without EGR operation is undertaken in step 160. This lambda control factor is stored in step 170 when the EGR is switched off.

The lambda control factor is formed in step 130 with the EGR system switched on and the lambda control factor is formed in step 160 with the EGR system switched off. In step 180, the difference of these two lambda control factors is formed and compared to pregiven threshold values with respect to a positive and negative deviation (steps 190, 195). In step 200, a determination is made as to whether these threshold values are exceeded or whether there is a drop below these threshold values. If this is the case, then an output of a fault of the EGR takes place in step 205.

In addition to a fault output, the magnitude of the deviation can be determined and be used as a corrective signal or an input signal for the control of the engine, for example, in the form of the injection time.

The method is only then carried out when the EGR rate is at least 5%.

The delay time advantageously is approximately 1.5 sec and the time for the mean value formation is approximately 2 to 5 sec.

It is understood that the foregoing description is that of the preferred embodiments of the invention and that various changes and modifications may be made thereto without departing from the spirit and scope of the invention as defined in the appended claims.

What is claimed is:

1. A method for diagnosing an exhaust-gas recirculation system of an internal combustion engine including a control apparatus for controlling said engine, the method comprising the steps of:

computing approximately a fuel quantity needed for a desired mixture composition in said control apparatus from stored data of said exhaust-gas recirculation system;

providing a lambda probe in said exhaust-gas recirculation system to generate a lambda control factor for operating on the time for injecting said fuel quantity;

checking whether following switch-on conditions for switching on said exhaust-gas recirculation system are satisfied:
(a) the engine is in a specific rpm/load window;
(b) the lambda control is active;

(c) the exhaust-gas recirculation is capable of activation; and,
(d) the engine temperature exceeds a certain pregiven threshold;

when the switch-on conditions are satisfied, then:
  computing and storing a first value of a lambda control factor for said desired mixture composition while said exhaust-gas recirculation system is switched on;
  computing and storing a second value of said lambda control factor while said exhaust-gas recirculation system is switched off;
  forming the difference between said first and second values of said lambda control factor;
  comparing said difference to pregiven values; and,
  if said difference constitutes a departure from said pregiven values, then outputting a fault signal indicative of a fault in said exhaust-gas recirculation system.

2. The method of claim 1, comprising the further steps of:
  determining the magnitude of said difference in said control apparatus; and,
  applying said magnitude as an input signal for controlling said engine.

3. The method of claim 1, wherein said method is carried out cyclically.

4. The method of claim 1, wherein said mixture composition is detected with a lambda sensor.

5. A method for diagnosing an exhaust-gas recirculation system of an internal combustion engine including a control apparatus for controlling said engine, the method comprising the steps of:
  computing approximately a fuel quantity needed for a desired mixture composition in said control apparatus from stored data of said exhaust-gas recirculation system;
  checking whether following switch-on conditions for switching on said exhaust-gas recirculation system are satisfied:
    (a) the engine is in a specific rpm/load window;
    (b) the lambda control is active;
    (c) the exhaust-gas recirculation is capable of activation; and,
    (d) the engine temperature exceeds a certain pregiven threshold;
  when the switch-on conditions are satisfied, then:
    computing and storing a first value of a control factor for said desired mixture composition while said exhaust-gas recirculation system is switched on;
    computing and storing a second value of said control factor while said exhaust-gas recirculation system is switched off;
    forming the difference between said first and second values of said control factor;
    comparing said difference to pregiven values;
    if said difference constitutes a departure from said pregiven values, then outputting a fault signal indicative of a fault in said exhaust-gas recirculation system; and,
  said method being carried out only when a component of exhaust gas in air inducted by said engine is at least 5% when said exhaust-gas recirculation system is switched on.

6. A method for diagnosing an exhaust-gas recirculation system of an internal combustion engine including a control apparatus for controlling said engine, the method comprising the steps of:
  determining a component of exhaust gas in air inducted by said engine and if said component is at least 5%, then carrying out the following additional steps;
  computing approximately a fuel quantity needed for a desired mixture composition in said control apparatus from stored data of said exhaust-gas recirculation system;
  checking whether following switch-on conditions for switching on said exhaust-gas recirculation system are satisfied:
    (a) the engine is in a specific rpm/load window;
    (b) the lambda control is active;
    (c) the exhaust-gas recirculation is capable of activation; and,
    (d) the engine temperature exceeds a certain pregiven threshold;
  when the switch-on conditions are satisfied, then:
    computing and storing a first value of a control factor while said exhaust-gas recirculation system is switched on;
    computing and storing a second value of said control factor while said exhaust-gas recirculation system is switched off;
    forming the difference between said first and second values of said control factor;
    comparing said difference to pregiven values; and,
    if said difference constitutes a departure from said pregiven values, then outputting a fault signal indicative of a fault in said exhaust-gas recirculation system.

* * * * *